United States Patent
Okitsu et al.

(10) Patent No.: US 7,636,311 B2
(45) Date of Patent: Dec. 22, 2009

(54) COMPLEX INFORMATION PLATFORM APPARATUS AND COMMUNICATION BAND ENSURING METHOD OF THE SAME

(75) Inventors: Jun Okitsu, Kodaira (JP); Yoshiko Yasuda, Tokorozawa (JP); Takashige Baba, Kodaira (JP); Toshiaki Tarui, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 502 days.

(21) Appl. No.: 11/655,997

(22) Filed: Jan. 22, 2007

(65) Prior Publication Data

US 2007/0177522 A1 Aug. 2, 2007

(30) Foreign Application Priority Data

Jan. 27, 2006 (JP) ............................. 2006-018365

(51) Int. Cl.
*H04L 12/28* (2006.01)
*H04L 12/56* (2006.01)
*G06F 15/173* (2006.01)
*G06F 13/00* (2006.01)

(52) U.S. Cl. .................... 370/235; 370/254; 370/395.2; 709/223; 710/316

(58) Field of Classification Search ......... 370/229–236, 370/254–258, 395.2; 709/220–229; 710/1, 710/104, 200–244, 316–317
See application file for complete search history.

(56) References Cited

U.S. PATENT DOCUMENTS 6,336,138 B1 * 1/2002 Caswell et al. .............. 709/223

(Continued)

FOREIGN PATENT DOCUMENTS

JP   2002-32153   7/2000

(Continued)

OTHER PUBLICATIONS

Robles-Gomez et al., "A Complete Topology Management Mechanism for the Advanced Switching Interconnect Technology", Computers and Communications, 2007; ISCC 2007; 12th IEEE Symposium on Jul. 2007; pp. 893-899.*

*Primary Examiner*—Tri H Phan
(74) *Attorney, Agent, or Firm*—Stites & Harbison, PLLC; Juan Carlos A. Marquez, Esq

(57) ABSTRACT

There is a need for applying an appropriate QoS setting to a complex information platform apparatus capable of flexibly changing an apparatus configuration so as to ensure an intra-apparatus communication band and realize management communication independence. Multiple processing modules are combined to construct one or more processing units with different apparatus types. An apparatus template management table prepares multiple levels of setting specifications with different ensured bands for intra-apparatus communication corresponding to each apparatus type. One set of setting specification is selected from multiple levels of setting specifications prepared for an apparatus type settled at the time of configuration setting. A QoS setting management table is generated based on the selected setting specification. When the configuration is set or changed, setting verification means verifies whether or not a total of ensured bands associated with each adapter is within an allowable range. When a result is negative, the setting specification is automatically changed to another provided with a smaller ensured band. A verified setting is distributed from the QoS setting management table to an IO switch and each adapter.

12 Claims, 12 Drawing Sheets

U.S. PATENT DOCUMENTS

| | | | |
|---|---|---|---|
| 6,662,221 B1 * | 12/2003 | Gonda et al. | 709/223 |
| 6,757,792 B2 * | 6/2004 | Morishita et al. | 711/154 |
| 2002/0008961 A1 | 1/2002 | Amaike et al. | |
| 2004/0172470 A1 * | 9/2004 | Shiina | 709/224 |
| 2004/0221103 A1 | 11/2004 | Morishita et al. | |
| 2006/0002298 A1 * | 1/2006 | Suzuki et al. | 370/235 |
| 2007/0110077 A1 * | 5/2007 | Takashige et al. | 370/395.53 |
| 2007/0168597 A1 * | 7/2007 | Baba et al. | 710/316 |

FOREIGN PATENT DOCUMENTS

| | | |
|---|---|---|
| JP | 2003-50749 | 8/2001 |
| JP | 2004-215116 | 1/2003 |

\* cited by examiner

FIG. 2

121
APPARATUS TEMPLATE MANAGEMENT TABLE

| APPARATUS TYPE | LEVEL | ENSURED BAND (GB/s) | | | PRIORITY | |
| --- | --- | --- | --- | --- | --- | --- |
| | | INTRA-APPARATUS COMMUNICATION | INTER-APPARATUS COMMUNICATION | INTRA-APPARATUS COMMUNICATION | INTRA-APPARATUS COMMUNICATION | INTER-APPARATUS COMMUNICATION |
| SERVER | H | 2 | 0 | | 2 | 3 |
| | M | 1 | 0 | | 2 | 3 |
| | L | 0.5 | 0 | | 2 | 3 |
| STORAGE | H | 2 | 0 | | 2 | 3 |
| | M | 1 | 0 | | 2 | 3 |
| | L | 0.5 | 0 | | 2 | 3 |
| ROUTER | H | 4 | 0 | | 2 | 3 |
| | M | 3 | 0 | | 2 | 3 |
| | L | 1 | 0 | | 2 | 3 |
| MANAGEMENT | - | 0 | 0.1 | | 2 | 1 |

FIG. 3

122
APPARATUS CONFIGURATION MANAGEMENT TABLE

| APPARATUS # | APPARATUS TYPE | LEVEL | GENERAL-PURPOSE PROCESSING MODULE | IO PROCESSING MODULE |
|---|---|---|---|---|
| 1 | SERVER | H | N1 | I1 |
| 2 | STORAGE | H | N2 | I2 |
| 3 | ROUTER | L | N3 | I3, I4 |
| 4 | MANAGEMENT SERVER | - | N4 | - |

FIG. 4

123
CAPACITY MANAGEMENT TABLE

| MODULE | IF # | CAPACITY (GB/s) |
|---|---|---|
| IO SWITCH | - | 10 |
| N1 | 1 | 2 |
| N1 | 2 | - |
| N2 | 1 | 3 |
| N2 | 2 | - |
| N3 | 1 | 3 |
| N3 | 2 | - |
| N4 | 1 | 3 |
| N4 | 2 | - |
| I1 | 1 | 2 |
| I1 | 2 | - |
| I2 | 1 | 3 |
| I2 | 2 | - |
| I3 | 1 | 3 |
| I3 | 2 | - |
| I4 | 1 | 3 |
| I4 | 2 | - |

FIG. 5

124
QOS SETTING MANAGEMENT TABLE

| COMMUNICATION TYPE | REQUEST IDENTIFICATION INFORMATION | | ENSURED BAND (GB/s) | PRIORITY |
|---|---|---|---|---|
| | SOURCE PROCESSING MODULE | SOURCE PROCESSING MODULE | | |
| COMMUNICATION IN APPARATUS #1 | N1 | I1 | 2 | 2 |
| | I1 | N1 | | |
| COMMUNICATION IN APPARATUS #2 | N2 | I2 | 2 | 2 |
| | I2 | N2 | | |
| COMMUNICATION IN APPARATUS #3 | N3 | I3 | 1 | 2 |
| | N3 | I4 | | |
| | I3 | N3 | | |
| | I4 | N3 | | |
| MANAGEMENT COMMUNICATION | N4 | N1 | 0.1 | 1 |
| | N4 | N2 | | |
| | N4 | N3 | | |
| | N1 | N4 | | |
| | N2 | N4 | | |
| | N3 | N4 | | |
| OTHERS | - | - | 0 | 3 |

COMMUNICATION TYPE MANAGEMENT TABLE

| COMMUNICATION TYPE | REQUEST IDENTIFICATION INFORMATION | |
| --- | --- | --- |
| | SOURCE MODULE | DESTINATION MODULE |
| COMMUNICATION IN APPARATUS #1 | N1 | I1 |
| | I1 | N1 |
| COMMUNICATION IN APPARATUS #2 | N2 | I2 |
| | I2 | N2 |
| COMMUNICATION IN APPARATUS #3 | N3 | I3 |
| | N3 | I4 |
| | I3 | N3 |
| | I4 | N3 |
| MANAGEMENT COMMUNICATION | N4 | N1 |
| | N4 | N2 |
| | N4 | N3 |
| | N1 | N4 |
| | N2 | N4 |
| | N3 | N4 |
| OTHERS | - | - |

114
BAND AND PRIORITY MANAGEMENT TABLE

| COMMUNICATION TYPE | ENSURED BAND (GB/s) | PRIORITY | AVAILABLE BAND (GB/s) |
|---|---|---|---|
| COMMUNICATION IN APPARATUS #1 | 1 | 2 | 0.1 |
| COMMUNICATION IN APPARATUS #2 | 2 | 2 | 0.3 |
| COMMUNICATION IN APPARATUS #3 | 1 | 2 | 0.5 |
| MANAGEMENT COMMUNICATION | 0.1 | 1 | 0.0 |
| OTHERS | - | 3 | - |

COMPLEX INFORMATION PLATFORM APPARATUS AND COMMUNICATION BAND ENSURING METHOD OF THE SAME

CLAIM OF PRIORITY

The present application claims priority from Japanese patent application JP 2006-018365 filed on Jan. 27, 2006, the content of which is hereby incorporated by reference into this application.

FIELD OF THE INVENTION

The present invention relates to an information platform apparatus. More specifically, the invention relates to a communication band ensuring method for a complex information platform apparatus composed of multiple general-purpose processing modules and IO processing modules.

BACKGROUND OF THE INVENTION

In recent years, there is an increasing need for consolidation of information platforms so as to improve the investment efficiency for IT systems in a corporation. The consolidation helps to gradually integrate processing units composed of individual frames such as a server, a router, and a storage into a single frame. In terms of the server, there is a widespread use of a blade server that mounts multiple servers in single frame for improved space saving and decreases the complicatedness of cabling for the power supply and networking. The blade server uses a thin case, called a blade, to mount elements such as a CPU, memory, and an HDD. Multiple blades are placed in a frame, called an enclosure, to implement high integration of the server. JP-A No. 32153/2002 describes this type of blade server. The storage or the router modularizes constituent elements of the processing unit for ensuring performance and scalability and connects only elements needed for the performance with the frame. For example, the storage modularizes a RAID controller or an HDD disk unit to duplicate the RAID controller and provide scalability of the storage capacity. The router modularizes an external interface function portion, called a line card, to provide scalability of the switch through capacity. In this manner, the present information platform apparatus modularizes processing unit's constituent elements in the processing unit. JP-A No. 215116/2004 describes that type of storage. JP-A No. 50749/2003 describes that type of router.

A system architecture for unifying these processing units can be represented as a complex information platform apparatus that uses one IO switch to connect multiple processing units. The complex information platform apparatus is composed of multiple general-purpose processing modules, an IO processing module to process a disk or an external network, and a management module to manage the complex information platform apparatus. Each module is connected to an IO switch via an adapter. A customer can flexibly change the configuration of the complex information platform apparatus and the function of the processing unit by changing a combination of modules according to needs.

A network switch is provided with the QoS (Quality of Service) to ensure a communication band and a priority for the network. The QoS function is represented by two models, IntServ and DiffServ. The IntServ model ensures the maximum available band or the minimum available band in a switch for a request concerning a given service. A management server manages a service-providing application or a switch. The management server may notify the switch's QoS function of an available band ensuring request composed of an identifier for service identification such as an ID and a corresponding available band. In such case, the switch's QoS function ensures a band dedicated to the switch for the request having the corresponding identifier. The DiffServ model provides priority control between requests in accordance with priority information in a request. The switch's QoS function provides priority control between requests in accordance with an identifier and a predetermined QoS policy. In this case, the identifier is used to identify a priority such as an ID or an address maintained in a request. Internet (http://www.ietf.org/rfc/rfc2998.txt) Integrated Services Over Diffserv Networks, November, 2000 describes this model in detail.

SUMMARY OF THE INVENTION

Generally, intra-apparatus communication bands are ensured for processing units such as a server, a router, and a storage. On the other hand, the complex information platform apparatus allows the same IO switch to be used for inter-apparatus communication and communication between processing modules (intra-apparatus communication) constituting an apparatus. The inter-apparatus communication presses a band for the intra-apparatus communication, making it impossible to ensure the band for the intra-apparatus communication. As a result, the performance of an individual processing unit cannot be ensured. The service level settled for a user cannot be realized. The complex information platform apparatus needs to ensure the intra-apparatus communication band and the performance of the individual processing unit.

A normal system divides the network into application communication and management communication such as Heart Beat to ensure independence of the management communication and prevent the system from being incorrectly controlled due to a management communication loss. On the other hand, the complex information platform apparatus uses the same IO switch for the management communication and the other communications. As a result, the complex information platform apparatus cannot ensure the management communication independence and may incorrectly control the system. The complex information platform apparatus needs to place a higher priority on the management communication and ensure its independence.

Internet (http://www.ietf.org/rfc/rfc2998.txt) Integrated Services Over Diffserv Networks, November, 2000 describes the use of the QoS function for ensuring the intra-apparatus communication band and the management communication independence. To do this, however, there are two problems as follows.

The first problem is that the switch's QoS function does not manage an available band setting or a QoS policy for ensuring the intra-apparatus communication band or the management communication independence. This problem may be solved when a manager settles the available band setting and the QoS policy and assigns them to the switch's QoS function based on the system configuration. However, it is impossible to achieve one of objectives of the complex information platform apparatus, i.e., fast service provision.

The second problem is that the switch's QoS function cannot specify a communication type (intra-apparatus communication, management communication, or other communications) of a request in the switch. Since the switch's QoS function cannot specify a communication type, the QoS function cannot be used to ensure a band or control a priority for each communication type.

Consequently, the invention needs to achieve two objects as follows. The first object of the invention is to provide a method of automatically generating and managing an ensured band and priority information for each communication type from configuration information about each processing unit in a complex information platform apparatus and to provide an apparatus having the method. The second object of the invention is to provide a method of specifying a communication type of a request and performing band guarantee and priority control using the band and priority information for each communication type and to provide an apparatus having the method.

According to one viewpoint, the invention is characterized as follows.

It is premised that a complex information platform apparatus according to the invention includes a general-purpose processing module for general-purpose processes, an IO processing module having an IO processing capability, a management module responsible for management in the complex information platform apparatus, and an IO switch for making connection between the processing modules and switching between communication requests. Each processing module has an adapter for communication. One or more processing modules can be combined to construct one or more processing units provided with different apparatus types.

The management module includes: an apparatus configuration management table prescribing connection relationship between a processing module and an IO switch; an apparatus template management table prescribing a specification for each apparatus type; and a QoS setting management table for ensuring a band for intra-apparatus communication and realizing management communication independence. The management module includes: QoS table initialization means for generating the QoS setting management table from the apparatus configuration management table and the apparatus template management table; setting verification means for verifying consistency between the QoS setting management table and the complex information platform apparatus; and QoS table distribution means for distributing the QoS setting management table to an adapter and an IO switch. The IO switch or the adapter includes: a communication type management table for managing request identifying information in a request and a corresponding communication type; and communication type specification means for specifying a communication type provided for a request. The IO switch includes QoS control means for providing QoS control in accordance with the communication type provided for a request and a setting in the QoS setting management table.

In particular, the apparatus template management table prescribes multiple specifications having different ensured band values for each apparatus type. One set of specification is selected from those specifications at the time of configuration setting to verify consistency of a specification selected by the setting verification means.

The management module receives a request to change the system configuration from the management client, and then executes system configuration setting means, the QoS table initialization means, the setting verification means, and the QoS table distribution means in order to automatically create the QoS setting management table. When the setting verification means detects inconsistency, the system configuration setting means is reexecuted.

The IO switch receives the request from the processing module via the adapter, and then executes the communication type specification means and the QoS control means in order to process the request and provide QoS control based on the QoS setting management table.

When a user changes a management server or a processing unit configuration, the invention automatically provides a QoS setting that ensures management communication independence and a band for intra-apparatus communication. The QoS control is provided for each request. As a result, it is possible to ensure the management communication independence and the performance of an individual processing unit without obliging a user to make complicated setting changes each time the system configuration needs to be changed.

BRIEF DESCRIPTION OF THE DRAWINGS

FIG. 2 is a configuration diagram of an apparatus template management table according to the first embodiment;

FIG. 3 is a configuration diagram of an apparatus configuration management table according to the first embodiment;

FIG. 4 is a configuration diagram of a capacity management table according to the first embodiment;

FIG. 5 is a configuration diagram of a QoS setting management table according to the first embodiment;

FIG. 6 is a configuration diagram of a communication type management table according to the first embodiment;

DETAILED DESCRIPTION OF THE PREFERRED EMBODIMENTS

Embodiments of the present invention will be described with reference to the accompanying drawings.

First Embodiment

Figure 1:
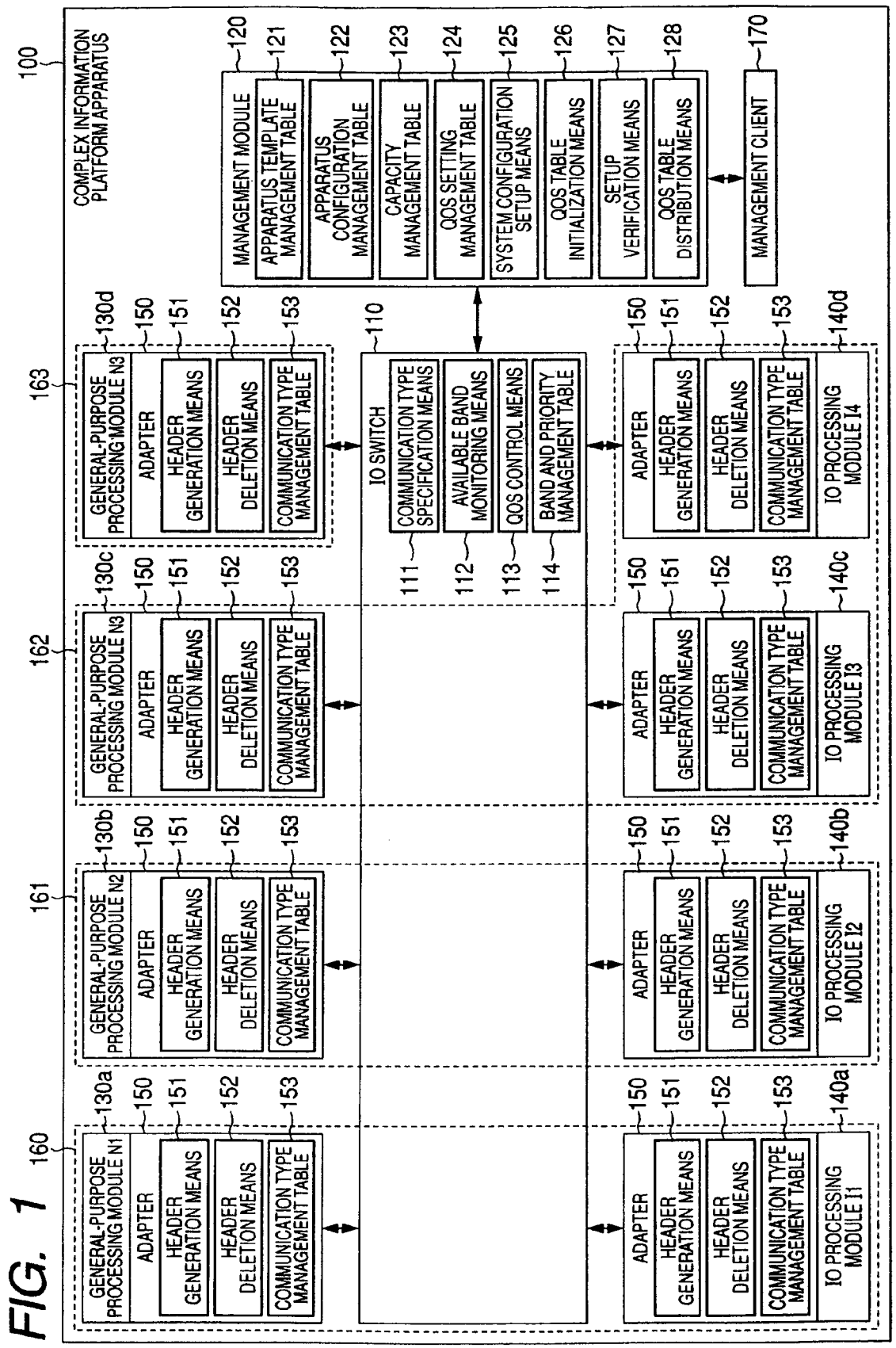
FIG. 1 is a block diagram showing a complex information platform apparatus according to a first embodiment of the invention.

FIG. 1 shows an overall configuration of a complex information platform apparatus 100 according to the first embodiment of the invention. The complex information platform apparatus 100 includes a management module 120, multiple general-purpose processing modules 130a through 130d, multiple IO processing modules 140a through 140d, an IO switch 110, an adapter 150, and a management client 170. The general-purpose processing modules 130a through 130d and the IO processing modules 140a through 140d are collectively referred to as processing modules. Each processing module is connected to the IO switch 110 via the adapter 150. Processing units 160, 161, 162, and 163 such as a server, a router, and a storage each include one or more general-purpose processing modules or IO processing modules.

The management module 120 manages the configuration of the complex information platform apparatus 100 and specifications of each processing unit. The management module 120 includes an apparatus template management table 121, an apparatus configuration management table 122, a capacity management table 123, a QoS setting management table 124, system configuration setting means 125, QoS table initialization means 126, setting verification means 127, and QoS table distribution means 128. The means and the tables will be described later in more detail. While the embodiment uses one management module 120, multiple management modules may be provided for improved reliability. When multiple management modules are provided, consistency between the management modules is maintained.

The general-purpose processing module 130a is a computer equipped with a CPU, memory, and the like. The general-purpose processing module performs function enhancement processes such as a network processor process for the router and a RAID control process for the storage. The general-purpose processing modules 130b through 130d have the same configuration as that of the general-purpose 130a. While the complex information platform apparatus in FIG. 1 is provided with four general-purpose processing modules, any number of general-purpose processing modules may be provided.

The IO processing modules 140a through 140d are dedicated to IO processes and provide a network adapter function, a hard disk drive function, a line card function for connection with an external network, and the like. Each function corresponds to the specific IO processing module. While the complex information platform apparatus in FIG. 1 is provided with four IO processing modules, any number of IO processing modules may be provided.

The IO switch 110 connects the processing modules with each other. The IO switch 110 transfers a request from a processing module to a different processing module to interchange information between processing modules. The internal configuration of the IO switch 110 may be a bus, a crossbar network, or a multi-stage network as long as information can be interchanged between processing modules. The protocol for the IO switch 110 may comply with an original technology or the standard technology such as ASI (Advanced Switching Interconnect) or MPLS (Multi Protocol Label Switching). The IO switch 110 includes communication type specification means 111, available band monitoring means 112, QoS control means 113, and a band and priority management table 114. The means and the table will be described later in more detail.

The adapter 150 attached to each processing module is an interface for connecting the processing module to the IO switch. For the purpose of multiprotocol transfer over a single network, the adapter 150 encapsulates a request from the processing module and transfers it to the IO switch 110. Further, the adapter 150 decapsulates a request from the IO switch 110 and transfers it to the processing module. An original technology or the standard technology such as ASI (Advanced Switching Interconnect) or MPLS (Multi Protocol Label Switching) may be used to encapsulate a multiprotocol request and transfer it over a single network. The adapter 150 includes header generation means 151, header deletion means 152, and a communication type management table 153. The means and the table will be described later in more detail.

The management client 170 is a computer equipped with a CPU, memory, and the like. The management client 170 transfers a request to change the apparatus specification or configuration from a manager to the management module 120.

In the complex information platform apparatus 100, one or more processing modules are combined to realize a processing unit for providing a specific processing function. For example, a processing unit 160 includes a general-purpose processing module 130a for computational processes and an IO switch processing module 140a for providing the network adapter function. The processing unit 160 provides the server function. A processing unit 161 includes a general-purpose processing module 130b for providing the RAID control process function and an IO processing module 140b for providing the hard disk drive function. The processing unit 161 provides the storage function. One processing unit may include multiple general-purpose processing modules or IO processing modules. For example, a processing unit 162 includes a general-purpose processing module 130c for performing network processor processes and two IO processing modules 140c and 140d for providing the line card function connected to an external network. The processing unit 162 provides the router function. Like a processing unit 163, a single general-purpose processing module may be assigned a specific processing function to be used as an independent processing unit. The following describes the tables and means provided for the management module 120.

The apparatus template management table 121 manages a specification for each apparatus type. FIG. 2 shows the configuration of the apparatus template management table 121 according to the embodiment. An apparatus type indicates the type of a processing unit formed by a combination of modules. The embodiment uses four apparatus types: "server" to provide the computer function; "storage" to provide the storage function; "router" to provide the network routing function; and "management server" to provide the system management function. The apparatus types are categorized according to the functions provided by the processing units. Further, the other classification methods may be used to determine apparatus types. Specifications for each apparatus type generally include processing module information needed to configure a processing unit, processing unit limitations, and a program or firmware used for the general-purpose processing module. As shown in FIG. 2, the apparatus template management table 121 lists specifications specific to the invention, i.e., an ensured band and a priority each for intra-apparatus communication and inter-apparatus communication. The intra-apparatus communication signifies communication between multiple processing modules constituting one processing unit. The inter-apparatus communication signifies communication between one processing unit and multiple processing modules constituting another processing unit. The inter-apparatus communication containing a processing unit whose apparatus type is the management server is referred to as management communication. Management communication examples include heart beat communication. The ensured band signifies a minimum ensured communication band that ensures the use of a minimum band for the communication if needed. In more detail, the apparatus template management table 121 assigns multiple levels of specifications provided with different values for the ensured bands out of the above-mentioned specifications specific to the invention at least correspondingly to the intra-apparatus communication for each apparatus type. According to the example in FIG. 2, the specification of the apparatus type "server" at level "H" provides the intra-apparatus communication with ensured band 2 GB/s and priority 2. The same specification provides the inter-apparatus communication with ensured band 0 GB/s (no minimum ensured communication band, i.e., best effort) and priority 3. The specification at level "M" decreases the ensured band to 1 GB/s. The specification at level "L" decreases the ensured band to 0.5 GB/s. Similarly, the apparatus types "storage" and "router" are each assigned three types of specifications, i.e., levels H, M, and L, provided with different ensured bands corresponding to the intra-apparatus communication. The priority is a value indicative of an order of precedence between communications. A smaller value indicates a higher priority. While the embodiment provides three levels, any number of levels may be provided.

The apparatus configuration management table 122 manages the configuration of a processing unit in the information platform apparatus. FIG. 3 shows the configuration of the apparatus configuration management table 122 according to the embodiment. Correspondingly to an apparatus number as a processing unit's unique identifier, the apparatus configuration management table 122 manages an apparatus types of the processing unit, a specification level selected from the above-mentioned ones, and processing modules constituting that processing unit. The capacity management table 123 manages capacities (available bands) for the IO switch 110 and the adapter 150 connected to each processing module. FIG. 4 shows the configuration of the capacity management table 123 according to the invention. When multiple adapters are connected to the processing module, the table additionally lists the adapters concerning the processing module.

The QoS setting management table 124 manages request identifying information, an ensured band, and a priority for each communication type. FIG. 5 shows the configuration of the QoS setting management table 124 according to the embodiment. The communication type represents a type of communication. The invention provides priority control and band control in accordance with the communication type. The embodiment provides such communication types as "intra-apparatus communication" for each processing unit, "management communication," and "other communications" inapplicable to the intra-apparatus communication and the management communication. It may be preferable to provide the other communication types such as "management module communication" between the management module 120 and the processing module, "inter-apparatus communication", and the like. The request identifying information can specify the communication type of a request and constitutes part of routing information contained in a header of the request. The request identifying information according to the embodiment includes a pair of identifiers assigned to a source processing module and a destination processing module for a request to be transmitted. A set of processing module constituting one processing unit may contain a pair of processing module identifiers constituting the request identifying information for a given request. In this case, the communication type for that request is "intra-apparatus communication." A request may not be assigned the communication type of intra-apparatus communication. Any of processing module identifiers contained in the request identifying information for that request may match an identifier of a processing module constituting the management server. In this case, the communication type for that request is "management communication." The communication type for the other requests is "other communications."

The system configuration setting means 125 sets or changes the apparatus configuration in accordance with a request from the management client 170 or automatically. This step of setting or changing the apparatus configuration corresponds to system configuration setting step S110 in the flowchart of FIG. 8. Setting or changing any items managed in the apparatus configuration management table 122 in FIG. 3 is equivalent to system configuration setting step S110 in FIG. 8.

When the system configuration setting means 125 sets or changes the apparatus configuration, setting a specification level corresponding to the apparatus number is important. As described with reference to FIG. 2, the apparatus template management table 121 predetermines multiple levels of specifications (H, M, and L) having different ensured bands for the intra-apparatus communication corresponding to each apparatus type. The system configuration setting step S110 selects a set of setting specifications out of the predetermined levels of setting specifications (H, M, and L) for an apparatus to be configured (a combination of processing modules). The most principled method of selecting the setting specification is the use of the management client 170 by a manager. According to a possible alternative, the manager may use the management client 170 to specify the apparatus type of a processing unit to be set. The system configuration setting means 125 may automatically select a setting specification having the largest ensured band out of the predetermined setting specifications for that apparatus type.

Figure 9:
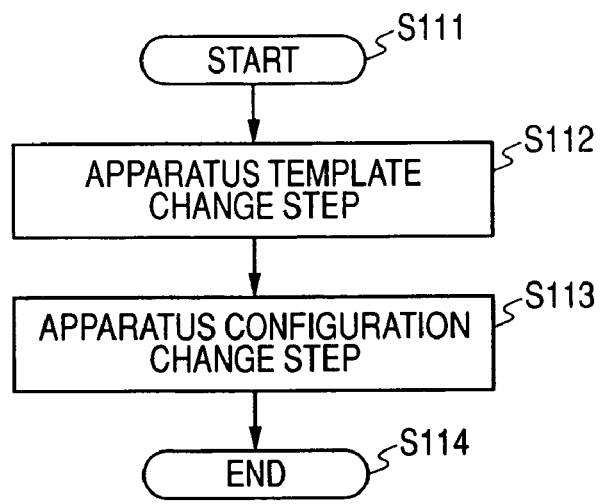
FIG. 9 is a flowchart showing an operation of system configuration setting means according to the first embodiment.

There may be a change in the combination of processing modules or the apparatus type managed in the apparatus configuration management table 122 or a change in the contents of the specification itself predetermined in the apparatus template management table 121. FIG. 9 shows an operation flow of the system configuration setting means 125 for these setting changes. The system configuration setting means 125 is called (S111) to perform apparatus template change step S112 and apparatus configuration change step S113 in order, and then terminates the process (S114). When receiving an apparatus specification change request from the management client 170, apparatus template change step S112 changes the apparatus template management table 121 in accordance with the apparatus specification change request. When receiving an apparatus configuration change request from the management client 170, apparatus configuration change step S113 updates the apparatus configuration management table 122 in accordance with the request from the manager.

Setting verification step S130 (FIG. 8) to be described in detail verifies whether or not the above-mentioned system configuration setting step appropriately sets or changes the system configuration. With reference to the flowchart in FIG. 8, setting verification step S130 calls system configuration setting step S110. The operation at Step S110 is to change the level of the specification concerning the processing unit corresponding to an adapter for which the sum of ensured bands found at the setting verification step exceeds an allowable capacity. When the processing unit is given specification level "H," for example, it is changed to "M" or "L." When the processing unit is given specification level "M," it is changed to "L." When the processing unit is given specification level "L," a message is transmitted to the management client 170 so as to prompt a change in the system configuration. While there have been described the changes to lower the levels, a change may be made to raise the levels when a sufficient adapter capacity is available.

Figure 10:
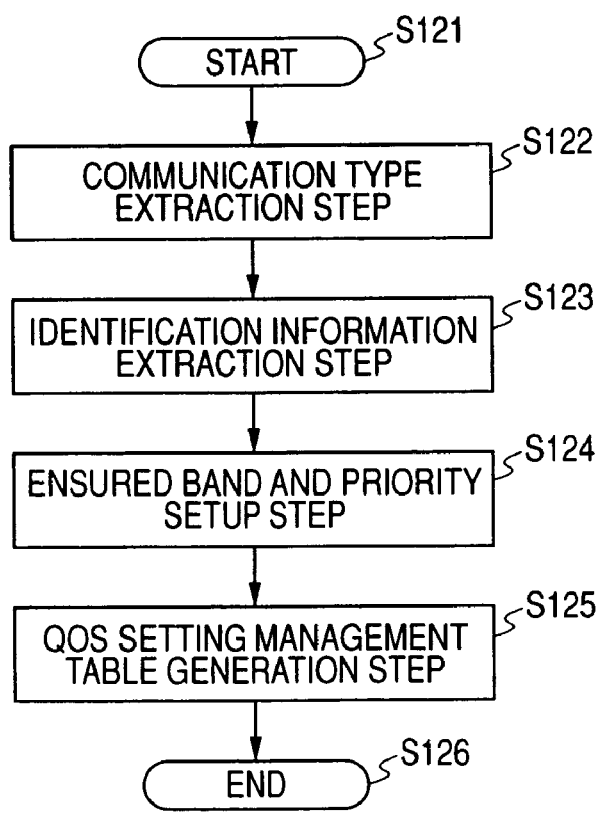
FIG. 10 is a flowchart showing an operation of QoS table initialization means according to the first embodiment.

The QoS table initialization means 126 uses the apparatus configuration management table 122 and the apparatus template management table 121 to automatically generate the QoS setting management table 124. The QoS setting management table 124 defines a QoS setting for ensuring an intra-apparatus communication band and realizing the management communication independence. FIG. 10 shows a flowchart for the QoS table initialization means 126. The QoS table initialization means 126 is performed (S121) to process communication type extraction step S122, identification information extraction step S123, ensured band and priority setting step S124, and QoS setting management table generation step S125 in order, and then terminates (S126).

At communication type extraction step S122, the QoS table initialization means 126 references the apparatus configuration management table 122 in FIG. 3 to extract a communication type targeted for QoS control. According to the settings of the apparatus template management table 121 in FIG. 2, the communication types targeted for the QoS control include the intra-apparatus communications of the processing units assigned with the server, storage, and router functions and the management communication. Accordingly, the QoS table initialization means 126 references the apparatus configuration management table 122 to extract four types of communications as QoS control targets, i.e., "communication in apparatus #1," "communication in apparatus #2," and "communication in apparatus #3" as intra-apparatus communications for apparatuses #1 through #3 and "management communication."

At identification information extraction step S123, the QoS table initialization means 126 references the apparatus configuration management table 122 in FIG. 3 to extract the request identifying information about the communication type extracted at communication type extraction step S122. With respect to the intra-apparatus communication, the QoS table initialization means 126 extracts, as the request identifying information, a set of identifiers for any two processing modules constituting the processing unit associated with the intra-apparatus communication. With respect to the management communication, the QoS table initialization means 126 extracts, as the request identifying information, a set of identifiers for the general-purpose processing module constituting a processing unit having the apparatus type of management server and for the general-purpose processing module constituting a given processing unit. The embodiment uses a processing module address as the processing module identifier.

At ensured band and priority setting step S124, the QoS table initialization means 126 references the apparatus template management table 121 in FIG. 2 and the apparatus configuration management table 122 in FIG. 3 to extract the ensured band and the priority for the communication type extracted at communication type extraction step S122. When the targeted communication type is intra-apparatus communication, the QoS table initialization means 126 first references the apparatus configuration management table 122 to obtain the apparatus type and the level of a processing unit targeted for the intra-apparatus communication. The QoS table initialization means 126 then references the apparatus template management table 121 to extract values for the ensured band and the priority concerning the intra-apparatus communication corresponding to the apparatus type and the level of the processing unit. When the targeted communication type is management communication, the QoS table initialization means 126 references the apparatus template management table 121 to extract values for the ensured band and the priority concerning the inter-apparatus communication for a management server as the apparatus type.

At QoS setting management table generation step S125, the QoS table initialization means 126 allows the QoS setting management table 124 in FIG. 5 to register the request identifying information extracted at identification information extraction step S123 and the ensured band and the priority extracted at ensured band and priority setting step S124 corresponding to each communication type extracted at communication type extraction step S122.

Figure 11:
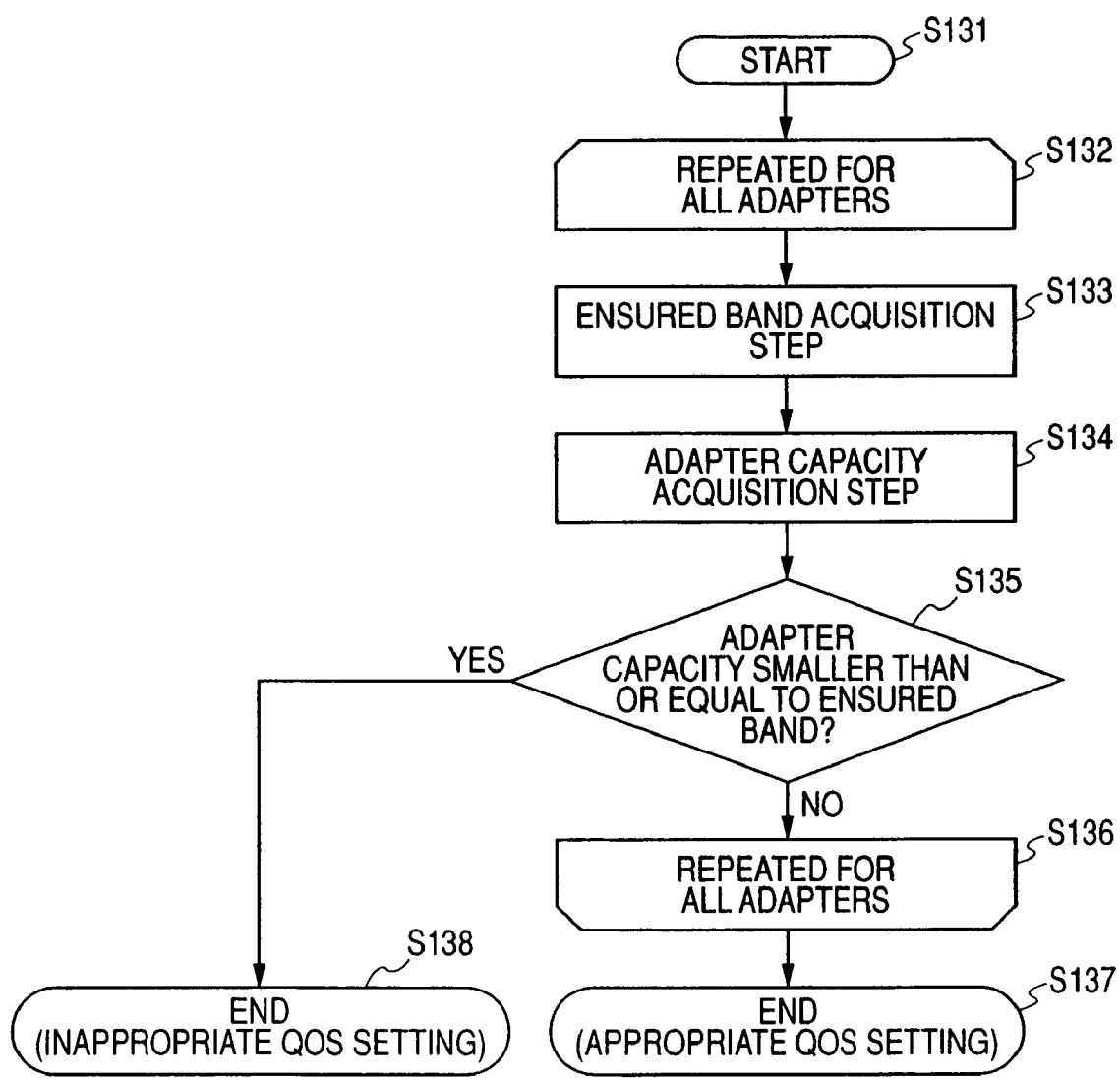
FIG. 11 is a flowchart showing an operation of setting verification according to the first embodiment.

The setting verification means 127 verifies whether or not the QoS setting in the QoS setting management table 124 generated by the QoS table initialization means 126 is applicable to the complex information platform apparatus 100. FIG. 11 shows a flowchart for the setting verification means 127. The setting verification means 127 references the capacity management table 123 and performs steps S133 through S135 for all the adapters.

At ensured band acquisition step S133, the setting verification means 127 references the QoS setting management table 124 to extract all communication types concerning processing modules connected to the adapter and obtain a total of ensured bands configured for communications performed by the processing module. This total is referred to as an ensured band total.

At adapter capacity acquisition step S134, the setting verification means 127 references the capacity management table 123 to obtain a capacity (available band) of the adapter. This capacity is referred to as an adapter capacity.

Figures 7, 8:
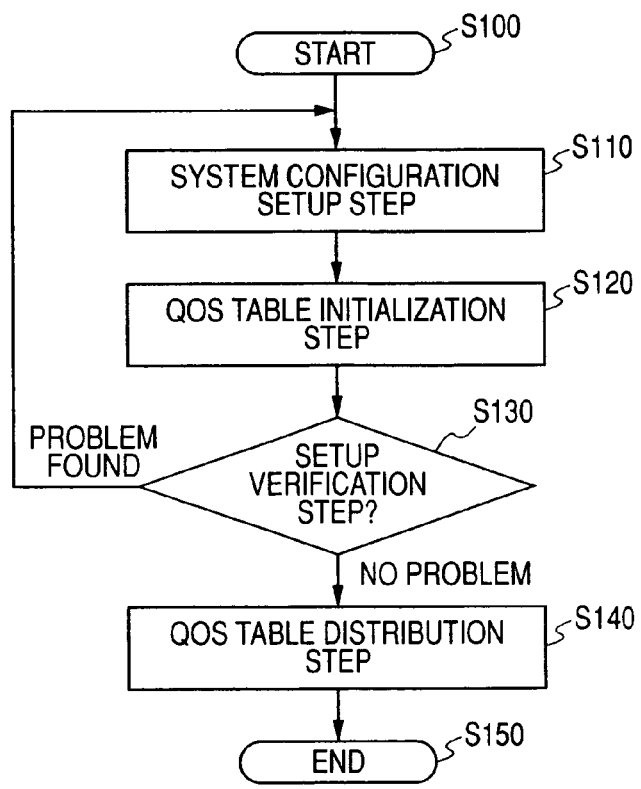
FIG. 7 is a configuration diagram of a band and priority management table according to the first embodiment.
FIG. 8 is a flowchart showing a process for QoS setting according to the first embodiment.

The setting verification means 127 compares the adapter capacity with the ensured band total. When the adapter capacity is smaller than or equal to the ensured band total, the setting verification means 127 determines that the QoS setting is inappropriate for the adapter. The setting verification means 127 then terminates (S138). When the QoS setting is inappropriate, system configuration setting step S110 in FIG. 8 is reexecuted as mentioned above. When the adapter capacity is larger than the ensured band total, the setting verification means 127 verifies the next adapter (S136).

After completing the verification for all the adapters, the setting verification means 127 assumes the QoS setting to be appropriate and then terminates (S137).

The QoS table distribution means 128 is performed when the QoS setting management table 124 is changed. The QoS table distribution means 128 allows the QoS setting management table 124 to be reflected on the communication type management table 153 for the adapter 150 and the band and priority management table 114 for the IO switch 110. The QoS table distribution means 128 allows the communication type management table 153 to reflect the request identifying information about each communication type in the QoS setting management table 124. The QoS table distribution means 128 allows the band and priority management table 114 to reflect the ensured band and the priority for each communication type in the QoS setting management table 124.

The following describes in detail the tables and means provided for the adapter.

The communication type management table 153 manages the request identifying information for each communication type. FIG. 6 shows the configuration of the communication type management table 153 according to the embodiment. The same contents are assigned to the request identifying information for each communication type in the communication type management table 153 and to the request identifying information for each communication type in the QoS setting management table 124. The communication type management table may be a subset of only entries that are to be referenced by the adapter and are extracted from the communication type management table 153 in FIG. 6.

When receiving a request from the processing module, the header generation means 151 appends a header for routing control to the request (encapsulates the request) and transfers the encapsulated request to the IO switch 110. At this time, the header generation means 151 references the request identifying information about the request and the communication type management table 153. The header generation means 151 specifies the communication type for the request and includes that communication type in the header.

The header deletion means 152 receives the request from the IO switch 110, deletes the header from the request (decapsulates the request), and transfers the decapsulated request to the processing module to be connected.

The following describes in detail the tables and means provided for the IO switch 110.

The band and priority management table 114 manages the ensured band, the priority, and a real available band for each communication type. FIG. 7 shows the configuration of the band and priority management table 114 according to the embodiment. The QoS table distribution means 128 updates the ensured band and the priority of the band and priority management table 114. The available band monitoring means 112 updates the real available band of the band and priority management table 114. The ensured band may be assigned no value. When no value is assigned to the ensured band, no band ensuring control is provided for the relevant communication type. The band and priority management table 114 is updated when the QoS table distribution means is performed. The same contents are assigned to the ensured band and the priority for each communication type in the band and priority management table 114 and to the ensured band and the priority for each communication type in the QoS setting management table 124 in FIG. 5.

The communication type specification means 111 references the communication type included in the request header to specify the request's communication type.

The available band monitoring means 112 monitors an available band for each communication type at a specified time interval and saves a value as the real available band at a specified location in the band and priority management table 114. The available band monitoring means 112 is always active while the complex information platform apparatus 100 is operating.

The QoS control means 113 ensures a minimum ensured band for each communication type and provides priority control. There may be case where the sum of the minimum ensured band for a given communication type and an actual available band for a communication other than that communication type exceeds the capacity of the IO switch 110. In this case, the QoS control means 113 according to the embodiment issues a request for inhibiting transfer of a request for communications other than the relevant communication type to each adapter. The QoS control means 113 references the band and priority management table 114 to obtain the sum of real available bands for communications other than the relevant communication type. The QoS control means 113 references the capacity management table 123 to obtain the capacity of the IO switch 110. The QoS control means 113 references the band and priority management table 114 to obtain request priorities in the IO switch 110. When requests compete with each other in the IO switch 110, the QoS control means 113 preferentially processes a request for the communication type provided with a higher priority. The standard QoS control for the IntServ and DiffServ models may be used for the QoS control means 113 to ensure the minimum band or control priorities in the IO switch 110.

The following describes a process flow for generating a QoS setting to ensure the intra-apparatus communication band and the management communication independence according to the embodiment. The process receives a request to change the apparatus template management table 121 or the apparatus configuration management table 122 from the management client 170, and then creates the QoS setting management table. The process distributes the QoS setting to the adapter 150 and the IO switch 110. FIG. 8 shows this process flow.

At system configuration setting step S110, the system configuration setting means 125 updates the apparatus template management table 121 or the apparatus configuration management table 122.

At QoS table initialization step S120 performed next, the QoS table initialization means 126 performs the following sequence of steps S122 through S125 as shown in FIG. 10.

At communication type extraction step S122, the QoS table initialization means 126 references the apparatus configuration management table 122 in FIG. 3 to extract the intra-apparatus communication concerning apparatus #1 (communication in apparatus #1), the intra-apparatus communication concerning apparatus #2 (communication in apparatus #2), the intra-apparatus communication concerning apparatus #3 (communication in apparatus #3), and the management communication.

At identification information extraction step S123, the QoS table initialization means 126 references the apparatus configuration management table 122 in FIG. 3 to extract the following sets of request identifying information (source processing module identifier and destination processing module identifier): two sets of (N1, I1) and (I1, N1) for the communication in apparatus #1; two sets of (N2, I2) and (I2, N2) for the communication in apparatus #2; six sets of (N3, I3), (N3, I4), (N4, I3), (I3, N3), (I4, N3), and (I3, N4) for the communication in apparatus #3; and six sets of (N4, N1), (N4, N2), (N4, N3), (N1, N4), (N2, N4), and (N3, N4) for the management communication.

At ensured band and priority setting step S124, the QoS table initialization means 126 references the apparatus template management table 121 and the apparatus configuration management table 122 to set the ensured band to 2 GB/s and the priority to 2 for the communication in apparatus #1. Similarly, the QoS table initialization means 126 sets the ensured band to 2 GB/s and the priority to 2 for the communication in apparatus #2. The QoS table initialization means 126 sets the ensured band to 1 GB/s and the priority to 2 for the communication in apparatus #3. The QoS table initialization means 126 sets the ensured band to 0.1 GB/s and the priority to 1 for the management communication.

At QoS setting management table generation step S125, the QoS table initialization means 126 allows the QoS setting management table 124 to reflect the results of steps S122 through S124.

At setting verification step S130, the setting verification means 127 repeats the setting verification process from steps S133 through S135 in FIG. 11 for all adapters registered to the capacity management table 123 in FIG. 4. For example, let us consider the setting verification process for an adapter connected to processing module N1. At ensured band acquisition step S133, the setting verification means 127 references the QoS setting management table 124 in FIG. 5 to total ensured bands concerning communication types including processing module N1 as the source processing module in the request identifying information. Targeted communications are "communication in apparatus #1" and "management communication" represented as the communication type. The setting verification means 127 references the QoS setting management table 124 to total ensured band values up to be 2.1 GB/s. At adapter capacity acquisition step S134, the setting verification means 127 references the capacity management table 123 to obtain 2 GB/s as the adapter capacity for the relevant adapter. The setting verification means 127 compares the total ensured band value 2.1 GB/s with the adapter capacity 2 GB/s. Since the adapter capacity is smaller than the ensured band, the setting verification means 127 determines the QoS setting to be inappropriate and then terminates (S135 and S138). System configuration setting step S110 is reexecuted.

At reexecuted system configuration setting step S110, the setting verification means 127 changes the level of apparatus #1 from "H" to "M" in the apparatus configuration management table 122 of FIG. 3 at apparatus configuration change step S113 and then terminates this step.

At the next QoS table initialization step S120, the QoS table initialization means 126 sets the ensured band for the communication in apparatus #1 to 1 GB/s in the QoS setting management table 124 of FIG. 5.

At the next setting verification step S130, ensured bands are totaled up to 1.1 GB/s for the adapter connected to processing module N1. The total value does not exceed the adapter capacity. Ensured bands for the other adapters do not exceed the adapter capacity. Accordingly, the setting verification means 127 determines the QoS setting to be appropriate and terminates step S130 (S137). The setting verification means 127 then executes QoS table distribution step S140.

At QoS table distribution step S140, the QoS table distribution means 128 allows the QoS setting management table 124 to be reflected on the communication type management table 153 and the band and priority management table 114. FIG. 6 shows the communication type management table 153 that reflects the QoS setting management table 124. FIG. 7 shows the band and priority management table 114 that reflects the QoS setting management table 124.

Figure 12:
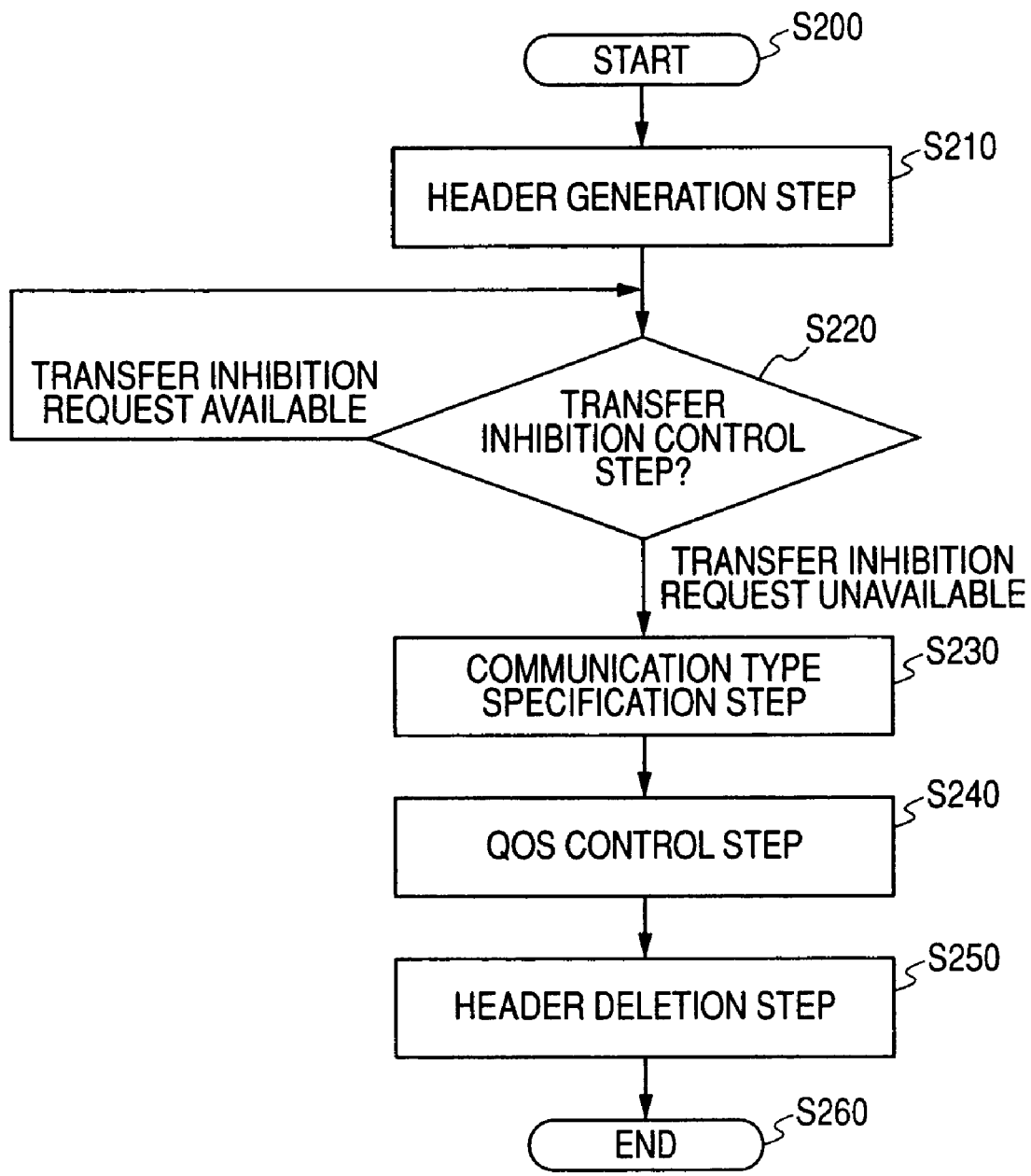
FIG. 12 is a flowchart showing an operation of a request issued from processing module according to the first embodiment.

The following describes a process flow of a request issued from each processing module. Let us suppose that general-purpose processing module N2 issues a request to general-purpose processing module N3. FIG. 12 shows an outline of the process flow.

The adapter 150 receives a request from general-purpose processing module N2 and starts header generation step S210. At header generation step S210, the header generation means 151 references the communication type management table 153 to determine that the communication type of management communication corresponds to the request identifying information (source processing module identifier, destination processing module identifier)=(N2, N3). The header generation means 151 assigns the identifier "management communication" to the communication type contained in the header. When the transfer inhibition control is not provided for the management communication at transfer inhibition control step S220, the process transfers the request to the IO switch 110.

The IO switch 110 receives the request from the adapter 150 and starts communication type specification step S230. At communication type specification step S230, communication type specification means 311 references the communication type in the request's header to identify that the request concerns the management communication.

At QoS control step S240, the QoS control means 113 provides QoS control in accordance with the request's communication type and the band and priority management table 114. The QoS control means 113 then transfers the request to the adapter 150 connected to processing module N3. At QoS control step S240, the QoS control means 113 issues a transfer inhibition request to each adapter as needed.

The adapter 150 receives the request from the IO switch 110 and starts header deletion step S250. At header deletion step S250, the header deletion means 152 deletes the header from the request received from the IO switch 110. The process transfers the request to general-purpose processing module N3 and then terminates (S260).

Second Embodiment

The invention can restrict a maximum available band for the intra- or inter-processing-unit communication. As a result, it is possible to fine-tune service levels in accordance with the user needs and usage fees.

Figure 13:
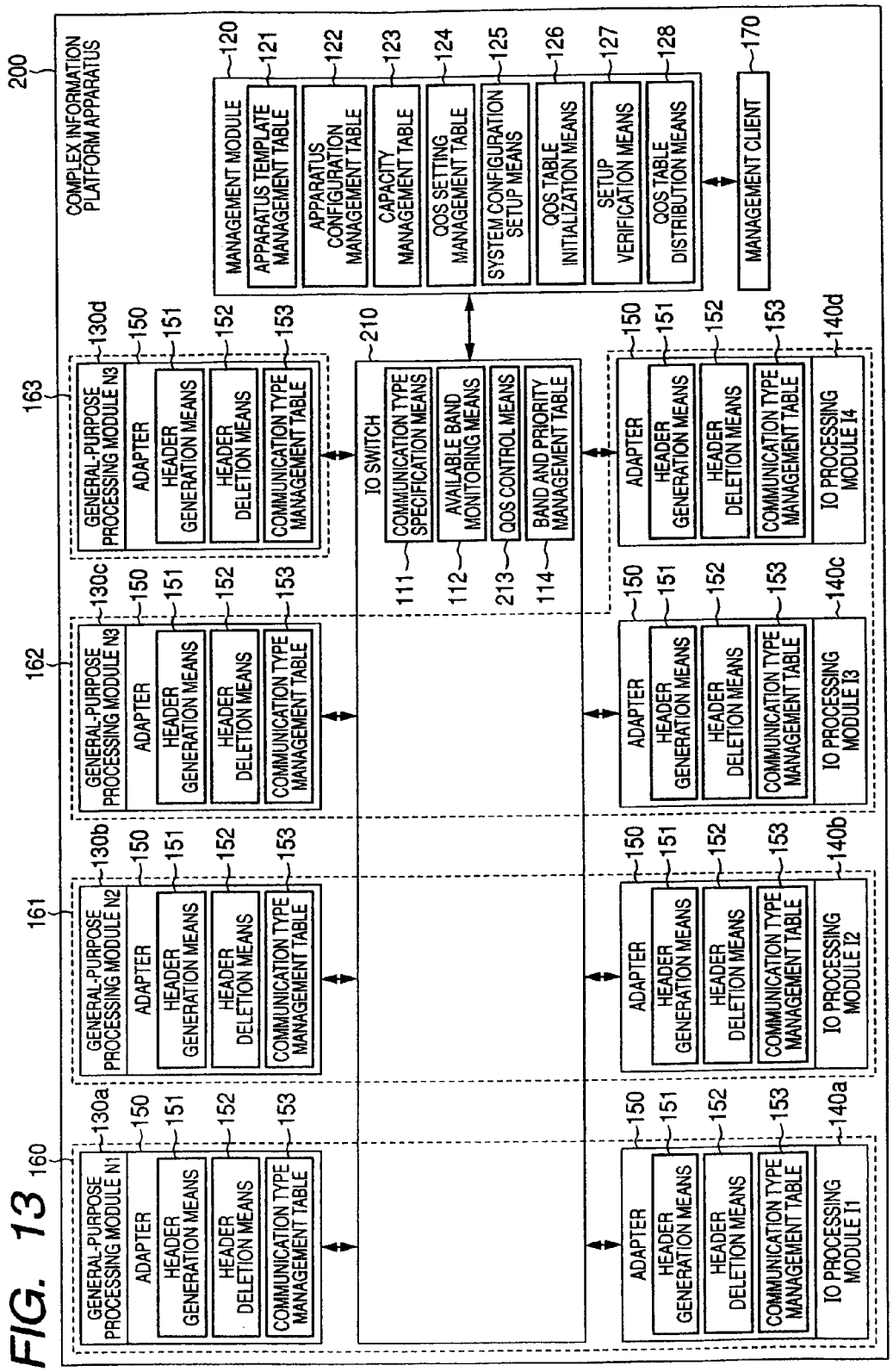
FIG. 13 is a block diagram showing a complex information platform apparatus according to a second embodiment of the invention.

The second embodiment of the invention restricts the maximum available band for a communication type. FIG. 13 shows the overall configuration of a complex information platform apparatus 200 according to the second embodiment. QoS control means 213 in an IO switch 210 differentiates this complex information platform apparatus from the one in FIG. 1 according to the first embodiment. The ensured band in the apparatus template management table 121 and the QoS setting management table 124 signifies the maximum available band usable for each communication type. The following describes differences from the first embodiment.

The QoS control means 213 restricts the maximum available band and controls priorities for each communication type. According to the embodiment, the QoS control means 213 references the band and priority management table 114 and the capacity management table 123 to obtain a real available band for the relevant communication type. When the real available band is greater than or equal to the maximum available band for the communication type, the QoS control means 213 issues a transfer inhibition request concerning the communication type to each adapter. Further, the QoS control means 213 references the band and priority management table 114 to obtain priorities of requests in the IO switch 210. When the requests compete with each other in the IO switch 210, the QoS control means 213 preferentially processes a request for the communication type provided with a higher priority. The standard traffic shaping control may be used to restrict the maximum available band for the QoS control means 213. The standard QoS control for the DiffServ model may be used for the QoS control means 213 to control priorities in the IO switch 110.

Third Embodiment

According to the first embodiment, the adapter's header generation means appends the communication type to the request's header. However, there may be a case where the adapter process cannot be changed. In such case, the IO switch process may be changed and the IO switch may specify the request's communication type based on routing information in the request's header.

The third embodiment of the invention solves the second object by changing the IO switch process without changing the adapter process. The third embodiment differs from the first embodiment in a location to maintain the communication type management table 153, and in header generation means 351 and the communication type specification means 311.

Figure 14:
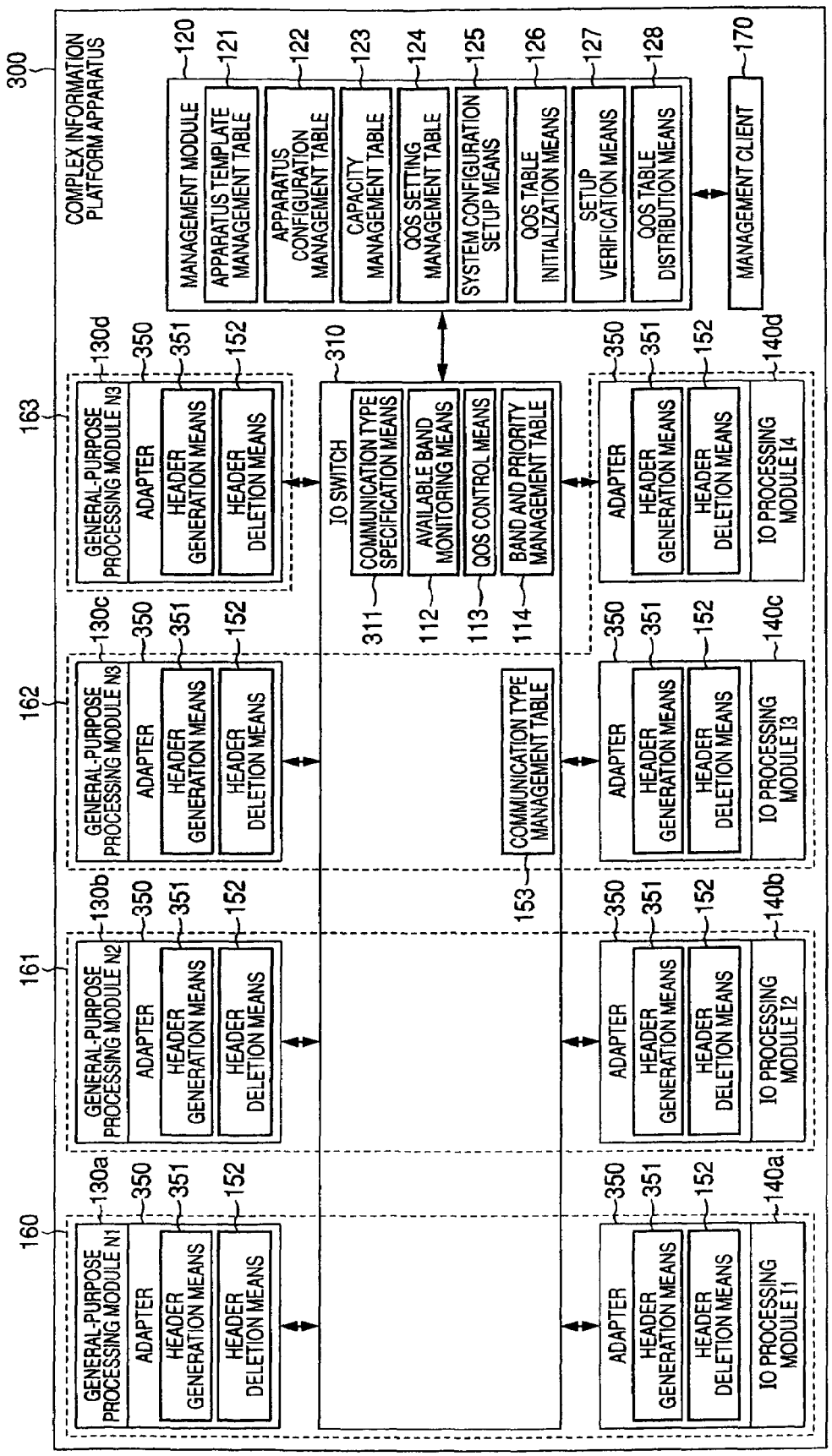
FIG. 14 is a block diagram showing a complex information platform apparatus according to a third embodiment of the invention.

FIG. 14 shows the overall configuration of a complex information platform apparatus 300 according to the third embodiment. Compared to the complex information platform apparatus 100 in FIG. 1, not an adapter 350, but an IO switch 310 maintains the communication type management table 153.

When receiving a request from the processing module to be connected, the header generation means 351 appends a header for routing control to the request (encapsulates the request) and transfers the encapsulated request to the IO switch 310. According to the third embodiment, the header generation means 351 appends no communication type to the header during the encapsulation. The header contains address information about destination and source processing modules as information for the routing control.

The communication type specification means 311 obtains an address for routing control from the request's header and specifies the request's communication type based on the address information and the communication type management table 153.

The invention is greatly advantageous to facilitating the operation and management of IT systems such as data centers and has a great chance of being applied to these fields.

What is claimed is:

1. A communication band ensuring method for a complex information platform apparatus including a plurality of processing modules, a switch for communication switching between processing modules, an adapter for connecting the processing modules with the switch, and a management module for managing these so that one or more processing units include one or more of the processing modules as constituent elements, the method comprising:
a preparation step of previously maintaining an apparatus template management table in the management module, wherein the apparatus template management table contains an ensured band for an intra-apparatus communication as a specification item correspondingly to each apparatus type for the processing unit and prescribes a plurality of levels of setting specifications provided with different ensured band values for the intra-apparatus communication;
a system configuration setting step of setting a combination of processing modules as constituent elements of a processing unit to be configured correspondingly to an apparatus number of the processing unit, setting an apparatus type of the processing unit, and selecting a setting specification for the processing unit from a plurality of levels of setting specifications for the apparatus type prescribed in the apparatus template management table;
a setting verification step of calculating a total value of ensured bands for a communication corresponding to an adapter for each processing module from a settled apparatus configuration and a selected setting specification and comparing the total value with a communication capacity for the adapter to verify applicability of the selected setting specification; and
a repetition step of, when a setting specification selected by the setting verification step is inappropriate, selecting another setting specification from the plurality of levels of setting specifications, reexecuting the setting verification step, and finally finding a setting specification in which a total value of ensured bands for a communication corresponding to an adapter for each processing module is smaller than or equal to a communication capacity of the adapter.

2. The communication band ensuring method according to claim 1, further comprising the step of:
extracting a communication type requiring QoS control from the apparatus template management table and generating a QoS setting management table that maintains an extracted communication type, a set of a transmission source identifier and a transmission destination identifier for identifying the communication type, and an ensured band for the communication type correspondingly to each other,
wherein an ensured band value in the QoS setting management table reflects selection of a setting specification at the system configuration setting step.

3. The communication band ensuring method according to claim 2,
wherein the setting verification step calculates a total value of ensured bands for a communication corresponding to an adapter for each processing module by totaling ensured bands for a communication type associated with a same transmission source identifier or transmission destination identifier in the QoS setting management table.

4. The communication band ensuring method according to claim 2 for a complex information platform apparatus,
wherein one of the communication types indicates a communication between the processing unit and a management module.

5. The communication band ensuring method according to claim 2 for a complex information platform apparatus,
wherein one of the communication types indicates a communication between the different processing units.

6. A complex information platform apparatus including a plurality of processing modules, a switch for communication switching between processing modules, an adapter for connecting the processing modules with the switch, and a management module for managing these so that one or more processing units include one or more of the processing modules as constituent elements,
wherein the switch routes a request based on routing information of a header contained in the request;
wherein the management module includes:
an apparatus configuration management table for maintaining correspondence between an apparatus type and an available processing module for each processing unit;
an apparatus template management table for maintaining correspondence among an apparatus type, an ensured band, and a priority;
a QoS setting management table for maintaining correspondence among a communication type uniquely determined from the apparatus configuration management table, an ensured band, and a priority;
system configuration setting means for creating the apparatus configuration management table and the apparatus template management table;
QoS table initialization means for creating the QoS setting management table;
setting verification means for verifying a setting of the QoS setting management table; and
QoS table distribution means for distributing part of the QoS setting management table to a switch and an adapter;
wherein the adapter includes:
a communication type management table for maintaining part of the QoS setting management table;
header generation means for appending routing information to a header of a request from a corresponding processing module; and
header deletion means for deleting a header of a request from the switch; and
wherein the switch includes:
a band and priority management table for maintaining correspondence among a communication type, band and priority information, and an available band as a monitoring result;
communication type specification means for specifying a communication type of the request;
available band monitoring means for monitoring an available band of a switch for each communication type and recording the available band in the band and priority management table; and QoS control means for obtaining a current available band from the band and priority management table to ensure a band and control a priority.

7. The complex information platform apparatus according to claim 6, wherein the header generation means appends the communication type to a header.

8. The complex information platform apparatus according to claim 6, wherein the apparatus template management table maintains an ensured band and a priority of an intra-apparatus communication for each apparatus type and ensures a communication band between processing modules constituting one processing unit in accordance with the ensured band and the priority.

9. The complex information platform apparatus according to claim 6, wherein the apparatus template management table maintains an ensured band and a priority of an inter-apparatus communication for each apparatus type and ensures a communication band between the processing unit and the management module in accordance with the ensured band and the priority.

10. The complex information platform apparatus according to claim 6, wherein the apparatus template management table maintains an ensured band and a priority of an inter-apparatus communication for each apparatus type and ensures a communication band between processing modules for different processing units in accordance with the band and the priority.

11. The complex information platform apparatus according to claim 6, wherein the apparatus template management table provides each apparatus type with a plurality of levels and allows an ensured band and a priority to correspond to each level of each apparatus type; and wherein the apparatus configuration management table maintains correspondence between the processing unit and the level.

12. The complex information platform apparatus according to claim 6, wherein the QoS setting management table maintains a combination of each communication type and a processing module capable of uniquely specifying a communication type.

* * * * *